United States Patent [19]
Ludwig et al.

[11] Patent Number: 5,810,910
[45] Date of Patent: Sep. 22, 1998

[54] ADSORBENTS FOR OZONE RECOVERY FROM GAS MIXTURES

[75] Inventors: Keith Alan Ludwig, Emmaus; Charles Gardner Coe, Macungie; James Edward MacDougall, New Tripoli, all of Pa.; Arne Baumgartl, Basingstoke, United Kingdom

[73] Assignee: Air Products and Chemicals, Inc., Allentown, Pa.

[21] Appl. No.: 540,110

[22] Filed: Oct. 6, 1995

[51] Int. Cl.⁶ .................................................. B01D 53/047
[52] U.S. Cl. .................... 95/138; 95/96; 95/902; 96/108; 96/144
[58] Field of Search ................ 95/96–105, 138, 95/902; 96/108, 130, 143, 144

[56] References Cited

U.S. PATENT DOCUMENTS

| | | | |
|---|---|---|---|
| 3,134,656 | 5/1964 | Donohue et al. | 95/138 |
| 4,259,299 | 3/1981 | Hagiwara et al. | 95/138 X |
| 4,280,824 | 7/1981 | Lassmann et al. | 95/138 X |
| 4,786,489 | 11/1988 | Gremier et al. | 95/138 X |
| 5,039,314 | 8/1991 | Lehmer et al. | 95/138 X |
| 5,507,957 | 4/1996 | Garrett et al. | 95/138 X |

FOREIGN PATENT DOCUMENTS

| | | | |
|---|---|---|---|
| 0564107 | 3/1993 | European Pat. Off. | C01B 10/10 |
| 52-41192 | 6/1977 | Japan . | |
| 53-28150 | 8/1978 | Japan . | |
| 54-32468 | 10/1979 | Japan | 95/138 |
| 55-047202 | 4/1980 | Japan | 95/138 |
| 56-168824 | 12/1981 | Japan | 95/138 |
| 01-149505 | 6/1989 | Japan | B01J 20/18 |

*Primary Examiner*—Robert Spitzer
*Attorney, Agent, or Firm*—John M. Fernbacher

[57] ABSTRACT

An improved adsorbent for ozone comprises a crystalline aluminosilicate in which at least 90% of the exchangeable cation content is in the acid form and further which contains between 0.5 and 20 wt % of one or more adsorbed components which are non-reactive with ozone. Preferably the adsorbed component is water, and the total non-framework metal content expressed as metal oxide is less than 0.4 mole %.

18 Claims, 2 Drawing Sheets

ADSORBENTS FOR OZONE RECOVERY FROM GAS MIXTURES

FIELD OF THE INVENTION

This invention pertains to the recovery of ozone from gas mixtures and in particular to zeolitic adsorbents for the recovery of ozone from ozone-oxygen mixtures.

BACKGROUND OF THE INVENTION

Ozone is generated by passing an oxygen-containing gas through a corona discharge to produce a dilute mixture of ozone and oxygen-containing gas. It is desirable to concentrate ozone for subsequent use, and this can be accomplished by adsorbing ozone from the mixture on an adsorbent and recovering concentrated ozone upon desorption. Silica gel is the commonly used adsorbent for ozone recovery by adsorption, but has a low adsorptive capacity for ozone at ambient temperatures which requires adsorber operation at lower temperatures approaching the cryogenic range. Producing the refrigeration necessary for operating at these low temperatures is expensive. In addition, silica gel catalyzes the decomposition of ozone such that adsorbed ozone rapidly decomposes to form oxygen, which reduces overall ozone recovery and increases the cost of ozone generation.

European Patent Application No. 93301794.9 describes a multilayered adsorption bed process for simultaneously producing an oxygen-rich product from air and recovering ozone generated from that oxygen-rich product. Silica gel is disclosed as an adsorbent for removing ozone from the ozone/oxygen mixture, and carbon molecular sieves are described for the recovery of oxygen from air.

Alternative adsorbents can be utilized for ozone recovery by adsorption. Japanese Patent Application No. 1-149505 discloses the ozone adsorbent H-ZSM-5 zeolite which contains sodium and lanthanum oxides, and teaches that the presence of lanthanum is important for the adsorptive capacity of the material. An ozone decomposition loss of up to 13% is reported during adsorption at −40° C.

Improved methods for the recovery of ozone by adsorption will be beneficial in the growing use of ozone in potable water treatment, wastewater disposal, and industrial applications. In particular, improved adsorbents are needed which reduce the decomposition of ozone which occurs during adsorption. An improved adsorbent which addresses these needs is disclosed in the following specification and defined in the claims which follow.

SUMMARY OF THE INVENTION

An adsorbent for the recovery of ozone from ozone-containing gas mixtures is disclosed which comprises a crystalline aluminosilicate in which at least 90% of the exchangeable cation content is in the acid form and further which contains between 0.5 and 20 wt % of one or more adsorbed components which are non-reactive with ozone. The total non-framework metal content of the adsorbent, expressed as metal oxide, is less than 0.4 mole %. The crystalline aluminosilicate can be derived from natural or synthetic sources including small, medium, or large pore zeolites which are stable in the acid form. These zeolites include but are not limited to chabazites, erionites, mordenites, offretites, ZSM-5, ZSM-11, ZSM-12, ferrierites, beta zeolites, and Y-type zeolites. Zeolites having molar Si/Al ratio of about 3.0 or greater should be stable in the acid form and therefore useful in the present invention. Preferably the zeolite is mordenite, ZSM-5, or a Y-type zeolite.

The adsorbed component is selected from the group consisting of water, carbon dioxide, argon, and sulfur hexafluoride. Preferably the adsorbed component is water at between about 0.5 and 15 wt % (based on dry adsorbent).

The invention includes a method for recovering ozone from an ozone-containing gas mixture which comprises contacting the gas mixture with the ozone-selective adsorbent described above whereby ozone is selectively adsorbed by the adsorbent, and recovering the ozone by desorption. The separation is carried out between −173° C. and 100° C., and less than 15% of the ozone selectively adsorbed by the adsorbent decomposes to oxygen prior to desorption.

In another embodiment, the invention is a method for reducing the decomposition rate of ozone adsorbed on a zeolite adsorbent which comprises adsorbing on the adsorbent, prior to ozone adsorption, one or more components which are non-reactive with ozone. The zeolite adsorbent comprises a crystalline aluminosilicate in which at least 90% of the exchangeable cation content is in the acid form and further which contains between 0.5 and 20 wt % of the one or more components which are non-reactive with ozone. The total non-framework metal content of the zeolite adsorbent preferably is less than 0.4 mole % expressed as metal oxide. The one or more components are selected from the group consisting of water, carbon dioxide, argon, and sulfur hexafluoride, and preferably the adsorbent contains between about 0.5 and 15 wt % adsorbed water (based on dry adsorbent).

The adsorbent of the present invention is an improvement over prior art ozone adsorbents because the reduced ozone decomposition rate and higher ozone adsorption capacity of the present adsorbent allows higher ozone recovery and more efficient operation of the ozone generation system for a given ozone production rate. In addition, ozone recovery can be carried out at higher temperatures using the adsorbent of the present invention compared with prior art adsorbents.

DETAILED DESCRIPTION OF THE INVENTION

Figure 1:
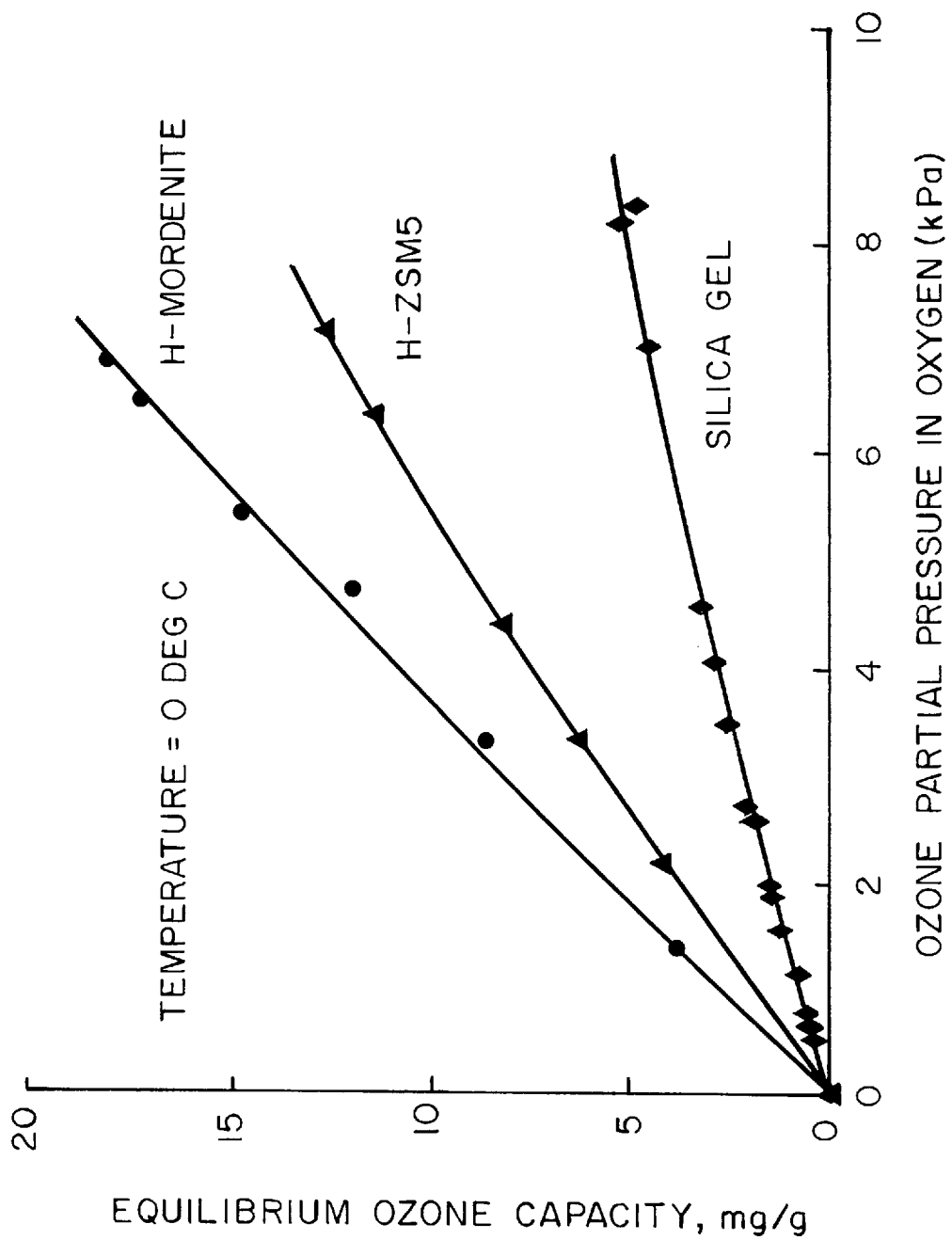
FIG. 1 is a plot of the amount adsorbed versus ozone partial pressure for silica gel and for adsorbents of the present invention.

Ozone is produced commercially by passing an oxygen-containing gas mixture through an electrical corona discharge which converts a small portion of the oxygen into ozone. The power consumed per unit mass of ozone produced is highly dependent on the concentration of ozone leaving the generator, and a doubling of the exit ozone concentration can increase the specific power consumption by a factor of two to three. Ozone generation is much more efficient with a feed gas mixture containing 90 vol % or more oxygen compared with the use of air. As a result, many commercial ozone installations utilize an air separation system to provide high oxygen content feed to the ozone generator.

Separation of ozone from the gas mixture exiting the ozone generator provides two operating advantages. First, when using a high oxygen concentration gas to feed the ozone generator, recovering the unconverted oxygen for recycle to the ozone generator provides a substantial saving in the cost of supplying the oxygen feed. Second, a separation process following the generator allows the generation of ozone at a low concentration, which is more power-efficient. The lower ozone concentration is subsequently increased in the separation process before final use. Both of these advantages reduce the cost of the ozone product.

Improved ozone generation is realized by utilizing the adsorbent of the present invention in a pressure swing adsorption process in conjunction with an ozone generator operating on a high oxygen content feed. The improved adsorbent is a crystalline aluminosilicate in which at least 90% of the exchangeable cation content is in the acid form and further which contains between 0.5 and 20 wt % of one or more adsorbed components which are non-reactive with ozone. The total non-framework metal content of the adsorbent, expressed as metal oxide, is less than 0.4 mole %. The term non-framework metal content as used herein includes the metals present as exchanged cations which balance the charge on the active anionic aluminosilicate framework as well as metals present in any binder material. The term metal content means any form of metal including cations, elemental metals, and metal-containing compounds. The metals are defined to include those in Groups 1–12 of the revised IUPAC Periodic Table (see *Pure & Appl. Chem.*, Vol. 60, No. 3, pp. 431–436, 1988).

It was found that the commercially available zeolite adsorbents with binders such as various types of clays readily decompose adsorbed ozone. It is believed that this occurs due to the presence of transition metal cations as well as alkali and alkaline earth cations such as $Na^+$ or $Ca^{++}$. Natural binder materials which are post-treated to remove metals by acid washing or other means also may be used. Preferred zeolitic adsorbents are binderless or contain metal-free binders with typical oxides such as silica or selected types of alumina and mixtures thereof. These adsorbent compositions, which are free of alkali, alkaline earth, and transition metals, are much more effective for ozone adsorption and do not promote significant ozone decomposition.

The preferred crystalline aluminosilicate is a zeolite selected from the group of zeolites which includes chabazites, erionites, mordenites, offretites, ZSM-5, ZSM-11, ZSM-12, ferrierites, beta zeolites, and Y-type zeolites. The adsorbent preferably is the acid form of a binderless zeolite or alternatively a zeolite with a non-reactive binder such as silica or selected type of alumina. The amount of non-framework metals or metal oxides, which promote decomposition of adsorbed ozone, should be minimized. Natural zeolites which typically contain alkali and alkaline earth cations as well as metal cations such as iron must be converted to the predominantly acid form for use as an ozone adsorbent. Any natural or synthetic zeolite in the acid form can be used; comparisons of siliceous zeolites having a wide range of Si/Al ratios indicate that the presence of acid sites within the zeolitic micropores is desirable.

Metallosilicates containing framework elements other than aluminum also should be useful as ozone adsorbents provided that these metallosilicates contain essentially no metal cations in the framework or metals in the non-framework portion of the adsorbent. The acid forms of gallosilicates and borosilicates are expected to work well since they exhibit milder acidity than the aluminosilicates. Aluminophosphates and silicoaluminophosphates also are expected to be effective as ozone adsorbents since they exhibit similar acidity as the borosilicates as long as the loading of adsorbed non-ozone components is optimized.

It was found that an appropriate amount of a preadsorbed component reduces ozone decomposition and increases the equilibrium adsorption capacity of the adsorbent for ozone. The preadsorbed component is selected from the group consisting of water, carbon dioxide, argon, and sulfur hexafluoride and should be present on the adsorbent at between 0.5 and 20 wt % (based on dry adsorbent). Preferably, the adsorbed component is water and is adsorbed at between about 0.5 and 15 wt % (based on dry adsorbent). More preferably, the adsorbed water content is between 0.5 and 10 wt %.

The ozone capacities of several zeolite materials with differing amounts of metals and preadsorbed water were determined at 0° C. and 5 kPa ozone partial pressure in order to understand the effects of these metals and preadsorbed water on ozone adsorption. Ozone capacities also were determined for silica gel adsorbent. Ozone capacity was measured by placing a sample of a known mass of adsorbent in a stainless steel container with inlet and outlet tubing, and placing the container in a constant temperature bath. Pure oxygen was fed to an ozone generator which produced a mixture of oxygen and ozone at constant composition, and the mixture was passed through the adsorbent at constant temperature and pressure. The flow rate and composition of the adsorbent feed and effluent streams were measured continuously until the ozone concentrations in the feed and effluent streams were equivalent. At this point, the adsorbent was judged to be at adsorption equilibrium and a known flow rate of nitrogen was passed through the adsorbent to desorb the adsorbed ozone. By measuring the composition of the desorption stream as a function of time, the amount of ozone adsorbed at the end of the adsorption step was calculated by integration and the ozone capacity in turn was calculated knowing the mass of adsorbent charged to the container.

Results at 0° C. and 5 kPa ozone partial pressure are summarized in Table 1 for ZSM-5, silicalite, faujasite, calcium A, and mordenite zeolites with varying amounts of preadsorbed water. It is seen that adsorbents containing significant amounts of metals (samples 8, 9, 10, 11, 13, and 16) exhibit low ozone capacity regardless of the presence of preadsorbed water; ozone adsorbed on these materials decomposes quickly to oxygen. It is also seen that preadsorbed water is necessary for satisfactory ozone capacity even if the metal content is low, as illustrated by samples 1–7.

TABLE 1

Ozone Adsorption Capacity for Zeolite Adsorbents

| Sample | Zeolite Type | Metal Content as Oxide, wt % | | | | | | Molar Ratio Si/Al | Ion Form | Adsorbed Water, Wt % (1) | Binder | Ozone Capacity, mg/g (2) |
|---|---|---|---|---|---|---|---|---|---|---|---|---|
| | | $Na_2O$ | MgO | $K_2O$ | CaO | $TiO_2$ | $Fe_2O_3$ | | | | | |
| 1 | ZSM-5 | 0.03 | 0.01 | 0.01 | 0.04 | 0.03 | <0.01 | 100 | H | 0 | Silica | 0.0 |
| 2 | ZSM-5 | 0.03 | 0.01 | 0.01 | 0.04 | 0.03 | <0.01 | 100 | H | 1.5 | Silica | 11.1 |
| 3 | ZSM-5 | 0.03 | 0.01 | 0.01 | 0.04 | 0.03 | <0.01 | 100 | H | 2.6 | Silica | 11.6 |
| 4 | ZSM-5 | 0.03 | 0.01 | 0.01 | 0.04 | 0.03 | <0.01 | 100 | H | 3.2 | Silica | 12.2 |

TABLE 1-continued

Ozone Adsorption Capacity for Zeolite Adsorbents

| Sample | Zeolite Type | Metal Content as Oxide, wt % | | | | | | Molar Ratio Si/Al | Ion Form | Adsorbed Water, Wt % (1) | Binder | Ozone Capacity, mg/g (2) |
|---|---|---|---|---|---|---|---|---|---|---|---|---|
| | | Na$_2$O | MgO | K$_2$O | CaO | TiO$_2$ | Fe$_2$O$_3$ | | | | | |
| 5 | ZSM-5 | 0.03 | 0.01 | 0.01 | 0.04 | 0.03 | <0.01 | 100 | H | 4.4 | Silica | 11.2 |
| 6 | ZSM-5 | 0.03 | 0.01 | 0.01 | 0.04 | 0.03 | <0.01 | 100 | H | 11 | Silica | 8.3 |
| 7 | ZSM-5 | 0.03 | 0.01 | 0.01 | 0.04 | 0.03 | <0.01 | 100 | H | 4.6 | Silica | 11.1 |
| 8 | Silicalite | 0.10 | 0.15 | <0.01 | <0.01 | 0.03 | 0.06 | >1000 | H | 1.5 | Silica | 11.1 |
| 9 | Faujasite | 0.07 | 2.71 | 0.15 | 0.86 | 0.15 | 0.81 | (3) | H | 1.8 | Clay | 0.0 |
| 10 | CaA | (3) | (3) | (3) | (3) | (3) | 0.58 | 1 | Ca | 16.3 | None | 1.8 |
| 11 | CaA | (3) | (3) | (3) | (3) | (3) | 0.58 | 1 | Ca | 1.7 | None | 0.0 |
| 12 | Mordenite | 0.09 | 0.14 | 0.14 | <0.01 | 0.31 | 0.44 | 5.2 | H | 7.4 | Clay | 6.5(4) |
| 13 | Mordenite | (3) | (3) | (3) | (3) | (3) | 0.87 | 6.2 | Na | 3.6 | None | 0.0 |
| 14 | Mordenite | 0.23 | 0.11 | 0.03 | 0.04 | 0.63 | 0.06 | 20 | H | 3.3 | None | 13.5 |
| 15 | Mordenite | 0.2 | 0.1 | 0.02 | 0.03 | 0.64 | 0.05 | 29 | H | 2.9 | None | 12.2 |
| 16 | Mordenite | (3) | (3) | (3) | (3) | (3) | 0.75 | 6.2 | Na | <0.2 | None | 0.0 |
| 17 | Mordenite | <0.31 | <0.15 | 6.37 | 0.06 | 0.04 | 0.04 | 55 | H | 2 | None | 10.1 |
| 18 | Mordenite | <0.31 | <0.15 | 0.03 | 0.05 | 0.60 | <0.01 | 119 | H | 1.5 | None | 9.9 |

(1) Determined by water loss at 400° C.
(2) At 0° C. and 5 kPa ozone partial pressure
(3) Not measured
(4) Extrapolated from data at lower partial pressure Additional ozone capacities were determined at varying ozone partial pressures at 0° C. by the method described above to compare two adsorbents of the present invention (H-mordenite and H-ZSM-5) with silica gel (W. R. Grace Ltd. dessicant grade 0123). The H-mordenite contained less than 0.01 wt % Fe$_2$O$_3$ and 3.3 wt % adsorbed water; the H-ZSM-5 contained less than 0.01 wt % Fe$_2$O$_3$ and other metals and 3.2 wt % adsorbed water. The results are plotted in FIG. 1. The data clearly show that the two zeolites of the present invention have 2–3 times higher ozone adsorption capacities than silica gel. Standard silica gels typically have surface areas of 750 to 800 m$^2$/g, bulk densities of 45 lbs/ft$^3$, and pore volumes of 0.52 cc/cc. These values are about twice the pore volume of both H-ZSM-5 (0.29 cc/cc) and mordenite (0.26 cc/cc). Surface areas for H-mordenite and H-ZSM-5 were about 330 m$^2$/g. The increased ozone capacities observed for the two zeolites of the present invention compared with silica gel are not simply due to increased surface areas or pore volumes, but result from differences in equilibrium adsorption properties and lower ozone decomposition rates.

Figure 2:
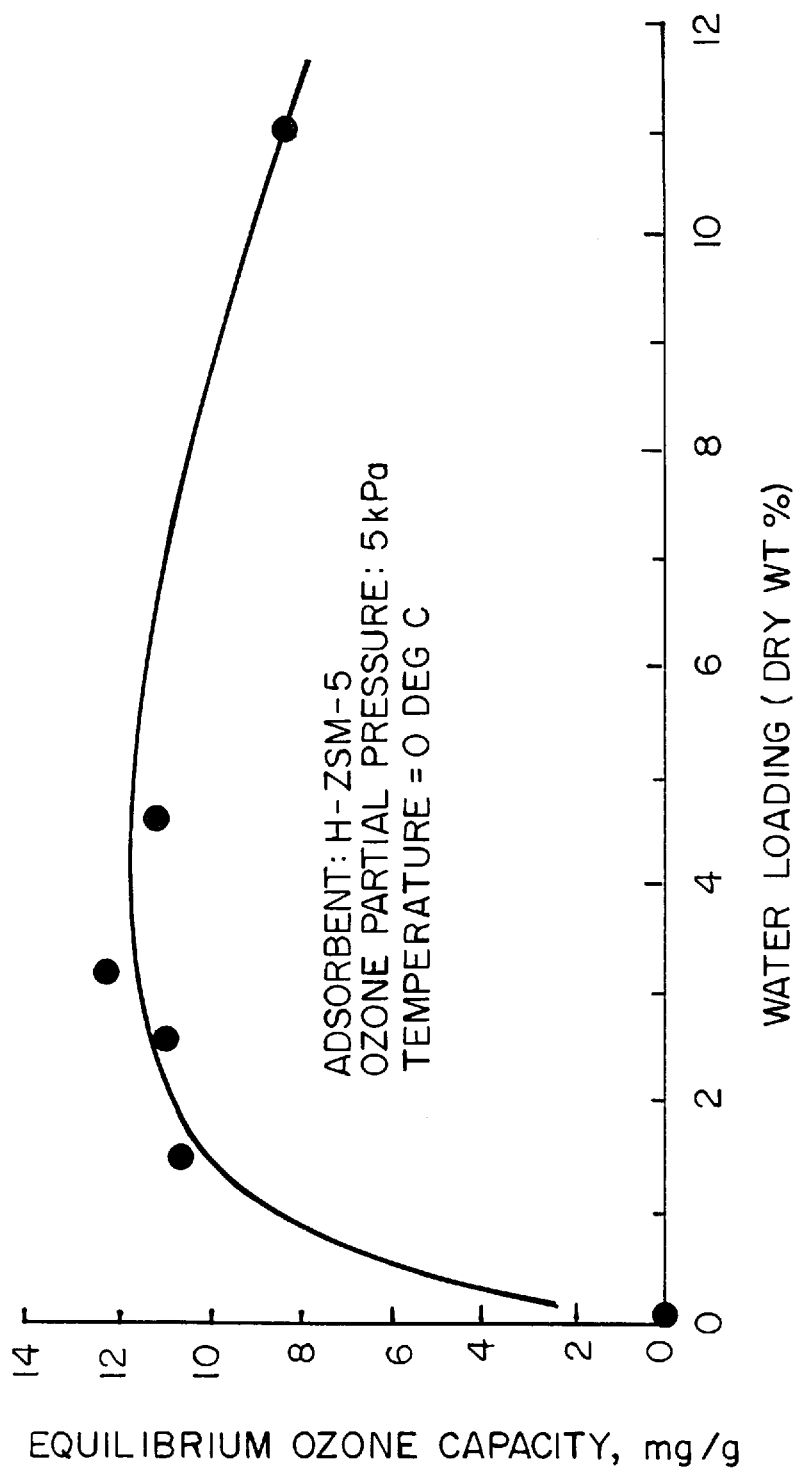
FIG. 2 is a plot of ozone adsorption capacity versus water loading for an adsorbent of the present invention.

The effect of preadsorbed water on the ozone adsorption capacity of H-ZSM-5 (Samples 1–7 in Table 1) is plotted in FIG. 2. The plot clearly shows that a preadsorbed water on H-ZSM-5 increases ozone capacity. A completely dry adsorbent has no ozone capacity because of he high rate of ozone decomposition, and at higher water loadings the ozone capacity is lower because less surface area is available for ozone adsorption. Preferably, the adsorbed component is water and is adsorbed at between about 0.5 and 15 wt % (based on dry adsorbent). More preferably, the adsorbed water content is between 0.5 and 10 wt %.

Any preadsorbed species which do not react with ozone can provide increased ozone capacity compared with the base adsorbent without preadsorbed species. Since the decomposition of ozone on an adsorbent without preadsorbed species results in zero effective ozone capacity, any amount of preadsorbed species will improve ozone capacity. In addition to water as discussed above, other adsorbed components such as carbon dioxide, argon, and sulfur hexafluoride are expected to provide similar benefits. These additional components if selected should be present on the adsorbent at between 0.5 and 20 wt % (based on dry adsorbent).

The results presented above indicate that a preferred adsorbent material for ozone adsorption is a self-bound H-mordenite containing between 0.5 and 10 wt % adsorbed water and a total non-framework metal content, expressed as metal oxide, of less than 0.4 mole %. The metal contents in Table 1 were determined in weight %, but can be converted to mole % in order to put all metal species on a common basis to define the referred adsorbent.

The amount of adsorbed ozone lost to decomposition on the adsorbents of the present invention is lower than the decomposition on silica gel. This was determined by utilizing the method described above for measuring ozone adsorption capacity, and in addition by performing an ozone mass balance to determine the total amount of ozone provided during the adsorption step. The ozone loss by decomposition was determined by calculating the difference between the total amount of ozone provided during the adsorption step minus the amount of ozone recovered at the end of the desorption step. The ozone decomposition rates determined in these experiments, expressed as the loss of ozone adsorptive capacity (in wt %) per minute during the adsorption step, are given in Table 2 and indicate the relative advantage of the zeolitic adsorbents with low metal content over silica gel. In addition, the results illustrate the relative effect of metal content and confirm that low metal contents are preferred for zeolite adsorbents.

TABLE 2

Comparison of Ozone Decomposition Rates

| Adsorbent | Loss of Ozone Adsorptive Capacity (wt %) per min. |
|---|---|
| Silica Gel | 1.6 |
| H-mordenite (0.44 wt % Fe) | 1.2 |
| H-ZSM-5 (<0.01 wt % Fe) | 0.7 |

Several important features of adsorbents of the present invention as described above lead to significant advantages over prior art adsorbents such as silica gel or metal-containing zeolites. First, zeolitic materials which have very low concentrations of cations, metals from Groups 1–12 of the revised IUPAC Periodic Table, and oxides of these metals exhibit greatly reduced decomposition of adsorbed ozone. Second, a preadsorbed component such as water is essential for maximizing the capacity of a material to adsorb ozone with minimum decomposition. This important feature is neither taught nor suggested in the prior art.

The adsorbents described above can be utilized in pressure swing adsorption (PSA) or vacuum swing adsorption (VSA) systems known in the art in which a plurality of adsorbers operate in a series of sequential adsorption and desorption steps which may include purge, rinse, and/or pressure equalization steps to reduce power consumption and improve recovery. Preferably the separation is carried out between −173° C. and 100° C., and less than 15% of the ozone selectively adsorbed by the adsorbent decomposes to oxygen prior to desorption. The use of the adsorbents of the present invention in PSA or VSA cycles can reduce compression power consumption by at least 10% due to reduced ozone decomposition. In addition, the increased capacity of the adsorbents can lead to a significant reduction in the size of adsorber vessels in the PSA or VSA systems. Reducing the size of the adsorber vessels reduces both adsorbent and vessel cost, and further improves the overall operating efficiency. Smaller adsorbers have less void volume and better heat transfer characteristics than larger adsorbers.

Prior art ozone adsorption systems using silica gel must operate at temperatures substantially below ambient to increase the ozone capacity of silica gel to an acceptable level. The zeolitic adsorbents of the present invention provide approximately the same ozone adsorption capacity at ambient temperature as silica gel operating at about −60° C.

The refrigeration for cooling silica gel adsorbent beds to these low temperatures is provided by rinsing the bed with liquid oxygen just prior to starting the adsorption step, which adds considerable operating cost to the process.

The adsorbent of the present invention provides an important safety advantage in the operation of a cyclic adsorption process for ozone recovery. If rapid and unexpected decomposition of adsorbed ozone were to occur in an adsorption vessel, the adsorbent temperature would rise since this decomposition is exothermic. This increase in temperature would further increase the rate of ozone decomposition, and the reaction could progress at an accelerating rate generating unacceptably high temperatures and pressures in the adsorber vessels. However, with the adsorbent of the present invention, the increase in temperature would desorb some of the preadsorbed water, and since the heat of desorption of water on these adsorbents is quite large, the desorption would consume heat liberated by the exothermic ozone decomposition reaction and thereby slow the exothermic ozone decomposition reaction. The heat consumed by the desorption of water would nearly balance the heat produced by the ozone decomposition reaction and thus protect the adsorbent against uncontrolled temperature increases.

The presence of preadsorbed water on the adsorbent of the present invention thus has a dual role in adsorption processes for ozone recovery. As illustrated by the experimental data disclosed above, the adsorption capacity of the adsorbent is increased by the presence of appropriate amounts of preadsorbed water which suppresses adsorbed ozone decomposition. In fact, without adsorbed water the adsorbent has essentially no adsorption capacity for ozone. In addition, preadsorbed water protects the adsorbent from serious temperature excursions in the event of unexpected ozone decomposition, which is an important self-limiting safety feature in adsorber operation.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A method for recovering ozone from an ozone-containing gas mixture which comprises contacting said gas mixture with an ozone-selective adsorbent whereby said ozone is selectively adsorbed by said adsorbent, and recovering said ozone by desorption from said adsorbent, wherein said adsorbent comprises a crystalline aluminosilicate in which at least 90% of the exchangeable cation content is in the acid form and further which contains between 0.5 and 20 wt % of one or more adsorbed components which are non-reactive with ozone.

2. The method of claim 1 wherein the total non-framework metal content of said adsorbent expressed as metal oxide is less than 0.4 mole %.

3. The method of claim 1 wherein said crystalline aluminosilicate has a framework in which the molar Si/Al ratio is at least 3.0.

4. The adsorbent of claim 1 wherein said crystalline aluminosilicate is a zeolite selected from the group consisting of mordenite, ZSM-5, and Y-type zeolite.

5. The method of claim 1 wherein said one or more adsorbed components are selected from the group consisting of water, carbon dioxide, argon, and sulfur hexafluoride.

6. The method of claim 5 wherein one of said one or more adsorbed components is water and wherein said adsorbent contains between about 0.5 and 15 wt % of said water (based on dry adsorbent).

7. The method of claim 1 wherein said gas mixture is contacted with said adsorbent at a temperature between −173° C. and +100° C.

8. The method of claim 1 wherein less than 15% of the ozone selectively adsorbed by said adsorbent decomposes to oxygen prior to said desorption.

9. A method for reducing the decomposition rate of ozone adsorbed on an adsorbent which comprises adsorbing on a zeolite adsorbent, prior to ozone adsorption, one or more components which are non-reactive with ozone, wherein the total non-framework metal content of said zeolite adsorbent is less than 0.4 mole % expressed as metal oxide.

10. The method of claim 9 wherein said zeolite adsorbent comprises a crystalline aluminosilicate in which at least 90% of the exchangeable cation content is in the acid form and further which contains between 0.5 and 20 wt % of said one or more components which are non-reactive with ozone.

11. The method of claim 10 wherein said one or more components are selected from the group consisting of water, carbon dioxide, argon, and sulfur hexafluoride.

12. The method of claim 1 wherein one of said one or more components is water and wherein said zeolite adsorbent contains between about 0.5 and 15 wt % of said water (based on dry adsorbent).

13. An adsorbent for the recovery of ozone from ozone-containing gas mixtures which comprises a crystalline aluminosilicate in which at least 90% of the exchangeable cation content is in the acid form and further which contains between 0.5 and 20 wt % of one or more adsorbed components which are non-reactive with ozone.

14. The adsorbent of claim 13 wherein the total non-framework metal content expressed as metal oxide is less than 0.4 mole %.

15. The adsorbent of claim 13 wherein said crystalline aluminosilicate has a framework in which the molar Si/Al ratio is at least 3.0.

16. The adsorbent of claim 13 wherein said crystalline aluminosilicate is a zeolite selected from the group consisting of mordenite, ZSM-5, and Y-type zeolite.

17. The adsorbent of claim 13 wherein said one or more adsorbed components are selected from the group consisting of water, carbon dioxide, argon, and sulfur hexafluoride.

18. The adsorbent of claim 17 wherein one of said one or more adsorbed components is water and wherein said adsorbent contains between about 0.5 and 15 wt % of said water (based on dry adsorbent).

* * * * *